2,980,495

METHOD OF PREPARING POLYMERIC PHOSPHO-NITRILIC FLUORIDE

Rudi F. W. Rätz and Christoph J. Grundmann, Columbus, Ohio, assignors to Olin Mathieson Chemical Corporation, a corporation of Virginia No Drawing. Filed Sept. 23, 1957, Ser. No. 685,409

6 Claims. (Cl. 23—14)

This invention relates to the preparation of polymeric phosphonitrilic fluorides and chlorofluorides.

The polymeric phosphonitrilic chlorides, especially the trimer and the tetramer of the formula $$(Cl_2P\equiv N)_n$$

wherein $n$ is a whole number, e.g. a small whole number of at least 3 and up to 7 to 11 or higher, can easily be prepared from phosphorus pentachloride and ammonium chloride. An analogous synthesis of the polymeric phosphonitrilic fluorides is not possible. Various attempts have been made to convert the phosphonitrilic chlorides into the corresponding fluorides by means of reaction with various metal fluorides. The only attempt, so far successful, was recently reported by F. Seel (Angewandte Chemie, vol. 68, 1956, page 461), who used potassium fluorosulfinate. This reagent, however, is difficult to prepare and furthermore extremely sensitive against moisture. When lead fluoride was applied, none of the expected phosphonitrilic fluorides could be obtained.

It has now surprisingly been found that the polymeric phosphonitrilic fluorides, especially the trimer and the tetramer, can be easily obtained in good yields by reacting the corresponding phosphonitrilic chlorides with silver monofluoride, AgF, according to the equation $$(Cl_2P\equiv N)_n + 2nAgF \rightarrow 2nAgCl + (F_2P\equiv N)_n$$

In this equation $n$ is a whole number, e.g. a small whole number of at least 3, 4, or up to 7 to 11 or higher. Contrary to other fluorinating agents, previously applied, silver monofluoride does not cause any cleavage of the P≡N bond or a change in the size of the molecule. In this respect silver monofluoride is unique, as compared with other known fluorinating agents as for example silver difluoride, $AgF_2$, mercury difluoride, $HgF_2$, lead difluoride, $PbF_2$, antimony trifluoride, $SbF_3$, or antimony pentafluoride, $SbF_5$. Furthermore, silver monofluoride is easily prepared, completely stable on storage, and not as hygroscopic as potassium fluorosulfinate.

The reaction between the polymeric phosphonitrilic chlorides and silver monofluoride is preferably carried out without application of a solvent or diluent, since the formed phosphonitrilic fluorides, especially the trimer and the tetramer, $(F_2PN)_3$ and $(F_2PN)_4$, are very volatile substances, which cannot be separated satisfactorily from a solvent or diluent.

The reaction between the polymeric phosphonitrilic chlorides and silver monofluoride is an exothermic one. It is preferably started by warming the mixture of the reactants until the spontaneous reaction begins, generally to a temperature between 80 and 150° C., depending on the molecular size of the employed phosphonitrilic chloride. During the exothermic phase of the reaction, application of external cooling may be necessary or advantageous. When the spontaneous reaction has ceased, the reaction is usually completed by refluxing the reaction mixture for several hours. The formed reaction products can be easily separated by fractional distillation or sublimation.

The fluorination proceeds stepwise, and by proper control of the reaction conditions, e.g. temperature, time, ratio between the phosphonitrilic chloride and the fluorinating agent, one can obtain partially fluorinated compounds, polymeric phosphonitrilic chlorofluorides. For instance, from $(Cl_2PN)_3$ there has been obtained $$P_3N_3Cl_2F_4$$

The chlorofluorides have the formula $$(Cl_aF_bPN)_n$$

wherein $n$ has the same meaning as in the fluorides above and when $n$ is from 3 to 11, $a$ and $b$ are from 0.33 to 1.99, the sum of $a$ and $b$ being 2. Expressed in another way the formula is $$P_nN_nCl_cF_d$$

wherein $n$ is as above and $c$ and $d$ range for 1 to $2n-1$, the sum of $c$ and $d$ being $2n$.

Sometimes it is preferable to fluorinate first the polymeric phosphonitrilic chloride to such a phosphonitrilic chlorofluoride or to a mixture of different chlorofluorides. In this case, the fluorination is completed by a second treatment of the chlorofluorides with silver monofluoride under conditions similar to those described above.

Mixed phosphonitrilic chlorofluorides with a chlorine content of less than about 25% Cl can also be completely fluorinated with silver difluoride, $AgF_2$. Although this variation of the process does not improve the yields, it presents in certain cases the advantage of cutting down the reaction time.

The various phosphonitrilic fluorides are valuable starting materials for new fluorine-containing phosphonitrile compounds. For example, they are useful to prepare polymeric ethyleneimido phosphorus nitriles which have utility as resinous materials as described in pending application Serial No. 657,722, filed May 8, 1957, now U.S. Patent No. 2,858,306, of Rudi Rätz and Christoph J. Grundmann. They are also useful to prepare polymeric polyfluoroalkyl phosphonitrilates with remarkable thermal stability as described in pending application Serial No. 669,700, filed July 3, 1957, now U.S. Patent No. 2,876,247, of Rudi F. W. Rätz and Christoph J. Grundmann. The above phosphonitrilates are also useful to prepare polymeric polychloropolyfluoroalkyl phosphonitrilates which are useful materials for imparting flame resistance to materials, e.g. fabrics, as described in pending application Serial No. 685,410, filed September 23, 1957, now U.S. Patent No. 2,876,248, of Rudi F. W. Rätz and Christoph J. Grundmann. Moreover the fluorides are polymerizable by heat at a temperature around 300° C., yielding a rubber-like material, which only consists of the elements phosphorus, nitrogen, and fluorine.

The invention will be further illustrated by the following examples.

EXAMPLE I

*Trimeric phosphonitrilic fluoride $(F_2PN)_3$*

In a 500 milliliter two-neck glass-flask connected with a reflux-condenser, 34.8 grams of pure, finely ground trimeric phosphonitrilic chloride $(Cl_2PN)_3$ was mixed with 132 grams of pulverized argentous fluoride (AgF). The condenser was supplied with ice water. The mixture was warmed up slowly to 80–90° C. by means of an oil bath. Around this temperature range an exothermic reaction started. The oil bath was then removed for some minutes until the reaction had ceased. To complete the reaction, the mixture was refluxed for four hours in an oil bath of 140° C. After standing over night, the condenser was exchanged for a sausage receiver which was cooled to −40° C. by Dry-Ice-powder. The separation of the reaction product from the silver salts was achieved by distillation from an oil bath of 130° C. temperature, first under atmospheric pressure, finally at 10 mm. pressure. A water-clear mobile liquid (22 grams) was obtained, which was not uniform, but a mixture of still impure phosphonitrilic fluoride with several different phosphonitrilic chlorofluorides. The liquid boiled under atmospheric pressure between 56 and 115° C. This liquid mixture of phosphonitrilic chlorofluorides (22 grams) was refluxed again with 15 grams of fresh argentous fluoride in an oil bath of 110–125° C. After 12 hours the completely fluorinated $(PNF_2)_3$ started to crystallize in the lower part of the reflux-condenser. By continuous refluxing with addition of 20 grams more of argentous fluoride all of the formed product was separated from the reaction mixture in this way. After 48 hours an amount of 8.5–10 grams $(PNF_2)_3$ of high purity was recovered by scraping the hard crystals out of the condenser with a metal spatula. Yield: 34.5–40.5 percent. Boiling point $_{750\ mm.}$: 51.8–52° C., melting point 28° C. (Thiele-apparatus-scaled capillary).

Calcd. for $P_3N_3F_6$: P, 37.40; N, 16.75; F, 45.8. Found: P, 36.04, 35.95; N, 16.40, 16.22; F, 45.47, 45.42.

The molecular weight was determined by mass-spectroscopy. The spectra obtained at 70, 14, 12 volts are well in agreement with a ring formula $P_3N_3F_6$. A very large m/e 249 peak confirms the expected molecular weight of 249.

EXAMPLE II

*Tetrameric phosphonitrilic fluoride $(F_2PN)_4$*

A mixture of 23.2 grams of tetrameric phosphonitrilic chloride $(Cl_2PN)_4$ and argentous fluoride (100 grams), finely pulverized, was reacted in the same manner as described in Example I. A strongly exothermic reaction started at 135° C. oil bath temperature. After two hours refluxing followed by standing over night, 10 grams of a liquid reaction product was separated from the silver salts by vacuum distillation at 160° C. and 3 mm. pressure. A sausage adapter cooled with carbon dioxide was used again as a receiver. Besides the 10 grams of liquid product, 3 grams of unreacted starting material was recovered, boiling at 180° C. and 3 mm. pressure. The liquid reaction product (10 grams) was then refluxed with 10 grams of fresh AgF. After six hours the first compact crystals of $(PNF_2)_4$ appeared in the lower part of the condenser. After 12 hours the remaining liquid was vacuum-distilled into a Dry-Ice cooled sausage receiver. Repeated fluorinations of this liquid product with 8 grams and 6 grams of fresh AgF, respectively, were carried out, resulting in an over-all yield of 5.75 grams $(PNF_2)_4 = 40$ percent. Boiling point $_{750\ mm.}$: 89.5–90.3° C., melting point 30° C.

Calcd. for $P_4N_4F_8$: P, 37.4; N, 16.75; F, 45.8. Found: P, 36.28, 36.14; N, 15.22, 15.11; F, 45.57, 45.55.

The mass-spectrum shows an extreme high parent peak at 332 m/e, which corresponds well to an eight-membered —P=N-ring with a molecular weight of 332.

EXAMPLE III

An amount of 10 grams of a mixture of phosphonitrilic chlorofluorides, obtained as described in Example I, was further fluorinated with 11 grams of argentic fluoride, $AgF_2$. The fluorinating agent was added at room temperature in small amounts over a period of four hours, heating after each addition for a short time to 110° C. The reaction was completed by refluxing finally for three hours at 125° C. The formed $(PNF_2)_3$ crystallized almost quantitatively in the lower part of the condenser. Yield: 4.4 grams; boiling point $_{750\ mm.}$: 52° C., melting point 28° C.

EXAMPLE IV

*Trimeric phosphonitrilic dichlorotetrafluoride* $(P_3N_3Cl_2F_4)$

This compound was obtained by fractional distillation of the liquid mixture of phosphonitrilic chlorofluorides, prepared as described in Example I. An amount of 22 grams of the liquid mixture gave 5 grams of pure $$P_3N_3F_4Cl_2$$

boiling point $_{750\ mm.}$: 106–109° C., 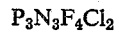: 1.4055.

Calcd. for $P_3N_3Cl_2F_4$: P, 33.00; Cl, 25.15. Found: P, 33.28, 33.04; Cl, 25.17, 25.18.

In order to achieve partial fluorination of the phosphonitrilic chloride—the ratio between the starting material and the fluonitrating agent should be 1.33 to 3.5 moles—of AgF per $PCl_2$ groups. The temperature is held between 80 and 150° C., preferably at 140° C. The reaction time is two to four hours and should not exceed six hours.

For complete fluorination of the phosphonitrilic chlorides, 4.4 to 5 moles of AgF per $PCl_2$ group and reaction times of at least six hours are required. The temperature is held within the same limits as above.

What is claimed is:

1. The method of preparing polymeric phosphonitrilic fluorides which comprises admixing polymeric phosphonitrilic chloride with silver monofluoride to form polymeric phosphonitrilic chlorofluoride, separating the said chlorofluoride and admixing said chlorofluoride with a silver fluoride selected from silver monofluoride and silver difluoride to produce the polymeric phosphonitrilic fluorides, said polymeric phosphonitrilic chloride and silver monofluoride being admixed at a temperature of about 80 to 150° C. and in proportions of about 1.33 to 3.5 moles of silver monofluoride per $PCl_2$ group and for a time of about 2 to 6 hours.

2. The method of claim 1 in which the polymeric phosphonitrilic chloride is the trimer.

3. The method of claim 1 in which the polymeric phosphonitrilic chloride is the tetramer.

4. The method of preparing polymeric phosphonitrilic fluorides which comprises admixing polymeric phosphonitrilic chloride with silver monofluoride at a temperature of about 80 to 150° C. and in proportions of about 4.4 to 5 moles of silver monofluoride per $PCl_2$ group and for a time of at least about 6 hours.

5. The method of claim 4 in which the polymeric phosphonitrilic chloride is the trimer.

6. The method of claim 4 in which the polymeric phosphonitrilic chloride is the tetramer.

References Cited in the file of this patent

The Phosphonitride Fluorides II Schmitz-Dumont and A. Braschos Zeitung der anorganische fur allgemeine Chemie, vol. 243, pages 113–26 (1940).

Phosphonitrile Fluorides-Schmitz-Dumont and Kulkens, Zeitung fur anorganische und allgemeine Chemie, vol. 238, 189–200 (1938).